UNITED STATES PATENT OFFICE.

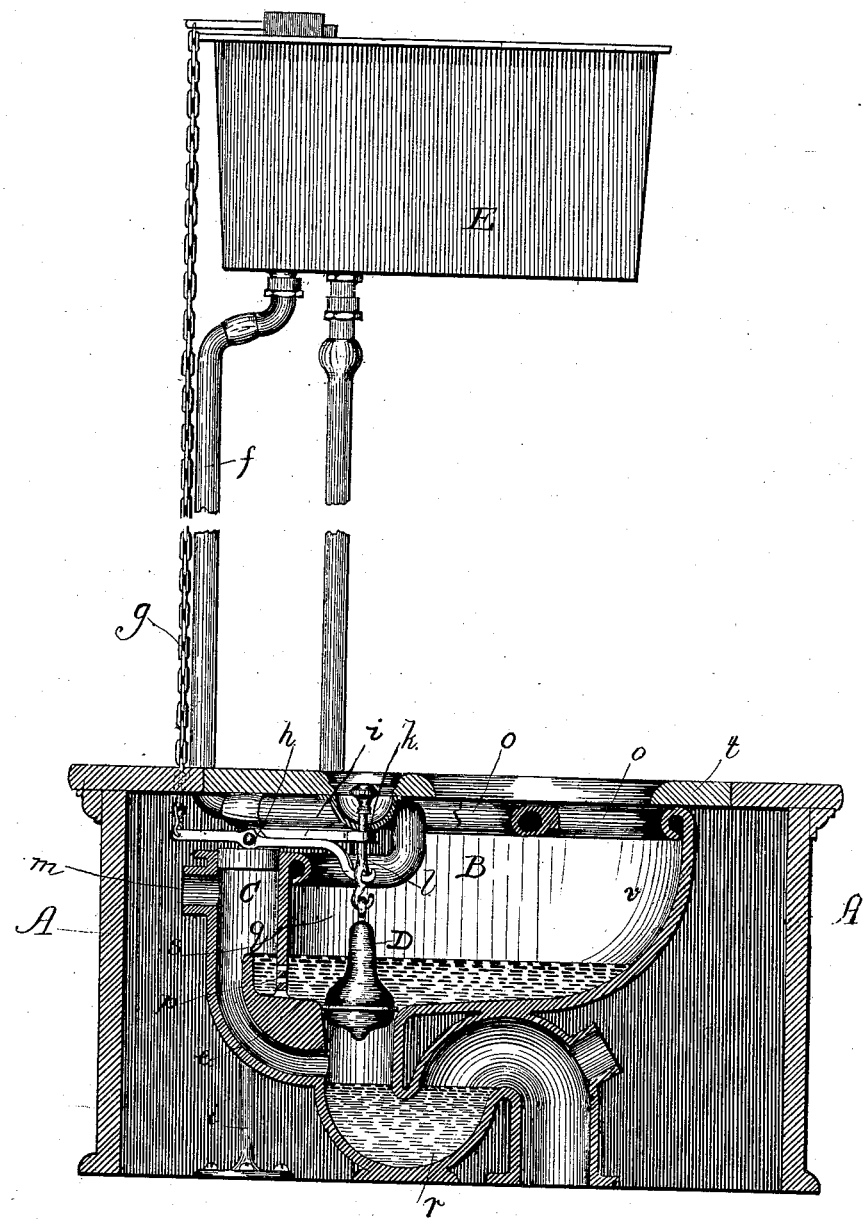

ROCKWELL SAYER, OF CHICAGO, ILLINOIS.

WATER-CLOSET.

SPECIFICATION forming part of Letters Patent No. 324,172, dated August 11, 1885.

Application filed December 30, 1884. (No model.)

*To all whom it may concern:*

Be it known that I, ROCKWELL SAYER, a citizen of the United States, residing at Chicago, in the county of Cook and State of Illinois, have invented certain new and useful Improvements in Water-Closets; and I hereby declare the following to be a full, clear, and exact description of the same.

My invention relates to the class of plunger water-closets, for use principally in private houses, in which the water for flushing the soil-receptacle is preferably supplied from a reservoir suitably located to avoid direct contact with the closet of the water-supply pipes, and in which a constant water-seal is provided.

It is my object to afford a commodity of the foregoing description in which there shall be no fouling, as is the case with other such water-closets, of the waste-passage and of the plunger-chamber, commonly provided, and in which the overflow shall be separately vented and constructed to afford a constant water-seal, effective in preventing the admission into the apartment of sewer-gas and air from the waste-pipe, without comprising a quantity of water sufficiently great to cause splashing of the person.

My invention consists in the particular construction and combinations of parts, by means of which the foregoing objects are accomplished.

The drawing represents a front sectional elevation of a water-closet provided with my improvements.

A is the frame-work supporting the seat $t$, all of usual construction, which seat leads to the soil-receptacle B, comprising the main or bowl portion $v$, and toward one side, directly over the opening to the trap $r$, the plunger-chamber $s$, but not having the latter separated by means of a partition from such main or bowl portion.

C is the overflow-chamber, having an independent vent-pipe, $m$, and provided with a wall, $q$, extending upward within it, the height of which wall determines the height of the water forming the water-seal in the receptacle B, and into which overflow-chamber from the lower side of the plunger-chamber $s$ the overflow-openings $p$ lead. A perforated or open flushing-rim, $o$, of usual construction is provided to extend entirely around the bowl and plunger-chamber.

D is the plunger, suspended by means of a suitable rod, $l$, operated in the usual manner and projecting through an annular head, $k$, forming a guide, provided at the extremity of the horizontal portion of a suitable bracket, $i$, secured to the floor within the frame-work A. A lever, $h$, fulcrumed toward its center, as shown, is hooked at one extremity into the rod $l$, and is connected at its opposite extremity, through the medium of a chain, $g$, with the valve mechanism, of ordinary construction, to control the supply of water to a reservoir or tank, E, and its discharge therefrom.

By raising the rod $l$, and with it the plunger D from its seat, water from the reservoir E will enter through a pipe, $f$, the flushing-rim $o$ and discharge into the receptacle B, flushing all parts of the internal surface of the latter, including the chamber $s$, before escaping into the trap $r$, with its desired effect. On releasing the handle of the rod $l$ the plunger D will fall upon its seat, closing the opening to the trap $r$, and shutting off the water-supply to the pipe $f$ from the reservoir E, when the contents of the pipe $f$ will enter and rise within the bowl $v$, plunger-chamber $s$, and overflow-chamber C, between the inner wall in which the overflow-openings $p$ are provided and the wall $q$. The surplus water beyond what forms the water-line in affording the water-seal, as determined by the height of the wall $q$, will discharge readily and forcibly, owing to the provision of the vent $m$ in the overflow-chamber into the trap $r$, by way of the passage $e$, flushing the latter, and, since only water ever enters this passage, maintaining it continually in a clean condition.

The advantages afforded by my construction are the following:

By separately venting the overflow-chamber and forming the main or bowl portion and the plunger-chamber in one without any objectionable partition separating them, and having an opening toward its lower side for the passage of the contents of the bowl into the plunger-chamber, fouling of the plunger-chamber, the overflow-chamber, and the passage leading from the latter into the trap, is avoided, since by my improvement these parts, which are open, free, and exposed to view and to the atmosphere, are kept clean, and therefore odorless, owing to the construction which permits the flushing-rim to extend as well around the plunger-chamber as around the bowl portion, and which thus allows the water to flush the inner surfaces of both.

By providing the overflow-openings below the water-line of the seal, communication from the pipes with the apartment is effectually closed to the admission of foul air and sewer-gas by a quantity of water sufficient to keep the bottom of the soil-receptacle clean and to float the soil, but exceedingly small when compared with other plunger closets having water-seals, produced by a quantity of water sufficiently large to cause splashing of the person.

What I claim as new, and desire to secure by Letters Patent, is—

1. A water-closet soil-receptacle, B, comprising in combination the main or bowl portion $v$, a plunger-chamber, $s$, formed within the said receptacle without partition from the said main or bowl portion, a flushing-rim, $o$, extending entirely around the said bowl portion and plunger-chamber, overflow-outlet $p$, formed toward a lower side of the said receptacle, an overflow-chamber, C, provided with a vent, $m$, and communicating with the said plunger-chamber through the said overflow-outlet $p$, and leading to the waste-pipe, and provided with a wall, $q$, extending above the said overflow-outlet, the whole being constructed and arranged to operate substantially as described.

2. A water-closet comprising, in combination with the frame A and seat $t$, the following elements, viz: a soil-receptacle, B, containing the main or bowl portion, $v$, and the plunger-chamber $s$, formed within it without partition from the said main or bowl portion and provided with a flushing-rim, $o$, extending entirely around it, overflow-outlet $p$, formed toward a lower side of the said receptacle, an overflow-chamber, C, provided with a vent, $m$, and communicating with the said receptacle through the said overflow-outlet $p$, and leading to a trap, $r$, connected to a suitable waste-pipe, and provided with a wall, $q$, extending above the said overflow-outlet, plunger D within the said plunger-chamber, means for operating the said plunger, a suitable water-supply, E, communicating with the said flushing-rim and valve mechanism within the said reservoir and connected with the said plunger, whereby the manipulation of the latter shall permit and prevent the introduction of water into the said receptacle, the whole being constructed and arranged to operate substantially as described.

ROCKWELL SAYER.

In presence of—
EDWARD THORPE,
MASON BROSS.